(12) United States Patent
Takanohashi et al.

(10) Patent No.: US 9,811,201 B2
(45) Date of Patent: Nov. 7, 2017

(54) TOUCH DETECTION CIRCUIT, TOUCH DETECTION METHOD, AND ELECTRONIC APPARATUS

(71) Applicant: Sony Corporation, Tokyo (JP)

(72) Inventors: Kazukuni Takanohashi, Tokyo (JP); Tsugita Komatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/225,159

(22) Filed: Aug. 1, 2016

(65) Prior Publication Data

US 2016/0334929 A1    Nov. 17, 2016

Related U.S. Application Data

(63) Continuation of application No. 14/447,104, filed on Jul. 30, 2014, now Pat. No. 9,430,110.

(30) Foreign Application Priority Data

Aug. 8, 2013    (JP) .................................. 2013-164859

(51) Int. Cl.
*G06F 3/044*    (2006.01)
*G06F 3/041*    (2006.01)
*G06F 3/0488*    (2013.01)

(52) U.S. Cl.
CPC ............ *G06F 3/0416* (2013.01); *G06F 3/044* (2013.01); *G06F 3/04883* (2013.01); *G06F 2203/04101* (2013.01); *G06F 2203/04104* (2013.01)

(58) Field of Classification Search
CPC .... G06F 3/044; G06F 3/04883; G06F 3/0416; G06F 2203/04104
See application file for complete search history.

(56) References Cited

U.S. PATENT DOCUMENTS

| | | | |
|---|---|---|---|
| 2009/0160787 A1* | 6/2009 | Westerman | G06F 3/044 345/173 |
| 2009/0284495 A1 | 11/2009 | Geaghan et al. | |
| 2010/0073301 A1* | 3/2010 | Yousefpor | G06F 3/044 345/173 |
| 2010/0149110 A1* | 6/2010 | Gray | G06F 3/0416 345/173 |
| 2013/0069905 A1* | 3/2013 | Krah | G06F 3/044 345/174 |
| 2013/0234987 A1* | 9/2013 | Ye | G06F 3/0418 345/174 |

FOREIGN PATENT DOCUMENTS

JP    2011-023012    2/2011

* cited by examiner

*Primary Examiner* — Kumar Patel
*Assistant Examiner* — Amy C Onyekaba
(74) *Attorney, Agent, or Firm* — K&L Gates LLP

(57) ABSTRACT

A touch detection circuit includes: a touch detection section configured to detect a plurality of touch points made by one or more users, based on positive data in a touch data map that includes the positive data and negative data; and a determination section configured to detect, based on the negative data in the touch data map, a plurality of negative points, and determine, based on the plurality of negative points, touch points made by same user in the plurality of touch points.

12 Claims, 15 Drawing Sheets

TOUCH DETECTION CIRCUIT, TOUCH DETECTION METHOD, AND ELECTRONIC APPARATUS

CROSS REFERENCES TO RELATED APPLICATIONS

The present application is a continuation application of U.S. patent application Ser. No. 14/447,104, filed on Jul. 30, 2014, which application claims priority to Japanese Priority Patent Application JP 2013-164859 filed in the Japan Patent Office on Aug. 8, 2013, the entire content of which is hereby incorporated by reference.

BACKGROUND

The present disclosure relates to a touch detection circuit to be used in a capacitance-type touch panel, a touch detection method, and an electronic apparatus including such a touch detection circuit.

Recently, a touch panel is mounted in various electronic apparatuses such as: a handheld terminal including a smartphone; a portable video game player; and a personal computer. Such electronic apparatuses eliminate necessity of a previously-used keyboard or button, leading to reduction in size of each apparatus. Moreover, various user interfaces for the touch panel have been developed, allowing a user to more instinctively perform information input or operation. Consequently, the touch panel becomes increasingly important as a user interface.

There are various types of touch panels, such as a capacitance-type, an optical type, and a resistance-type. In particular, the capacitance-type touch panel is characteristically capable of detecting a human finger or the like not only when the finger is in contact with a touch detection surface but also when the finger is in proximity to the touch detection surface. This allows diverse user interfaces to be achieved. Hence, the capacitance-type touch panel is becoming used for various electronic apparatuses.

When an electronic apparatus is operated using such a touch panel, one user may operate the touch panel with a plurality of fingers, or a plurality of users may operate the touch panel. In such a case, it is necessary for the touch panel to detect a plurality of touches (multi-touch). For example, Japanese Unexamined Patent Application Publication No. 2011-23012 and publication of US patent application 2009/0284495A1 each disclose a capacitance-type touch panel capable of detecting multi-touch.

SUMMARY

A touch panel is desirably capable of more instinctively performing information input and operation even in the case of multi-touch, and is expected to have a high function as a user interface.

It is desirable to provide a touch detection circuit capable of improving a user interface function, a touch detection method, and an electronic apparatus.

According to an embodiment of the present disclosure, there is provided a touch detection circuit, including: a touch detection section configured to detect a plurality of touch points made by one or more users, based on positive data in a touch data map that includes the positive data and negative data; and a determination section configured to detect, based on the negative data in the touch data map, a plurality of negative points, and determine, based on the plurality of negative points, touch points made by same user in the plurality of touch points.

According to an embodiment of the present disclosure, there is provided a touch detection method, including: detecting a plurality of touch points made by one or more users, based on positive data in a touch data map that includes the positive data and negative data; detecting, based on the negative data in the touch data map, a plurality of negative points; and determining, based on the plurality of negative points, touch points made by same user in the plurality of touch points.

According to an embodiment of the present disclosure, there is provided an electronic apparatus provided with a touch detection device and a touch detection circuit. The touch detection device is configured to detect an external proximity object. The touch detection circuit includes: a touch detection section configured to detect a plurality of touch points made by one or more users, based on positive data in a touch data map that includes the positive data and negative data; and a determination section configured to detect, based on the negative data in the touch data map, a plurality of negative points, and determine, based on the plurality of negative points, touch points made by same user in the plurality of touch points.

Non-limiting examples of the electronic apparatus may include a television unit, a monitor unit, and a tablet terminal.

In the touch detection circuit, the touch detection method, and the electronic apparatus according to the above-described respective embodiments of the present disclosure, the plurality of touch points are detected based on the positive data, and the plurality of negative points are detected based on the negative data. In the plurality of touch points, the touch points made by the same user are determined based on the plurality of negative points.

According to the touch detection circuit, the touch detection method, and the electronic apparatus in the above-described respective embodiments of the present disclosure, the plurality of negative points are detected based on the negative data. Hence, it is possible to improve the user interface function.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure will be described in detail with reference to the accompanying drawings. It is to be noted that description is made in the following order.
1. First embodiment.
2. Second embodiment.
3. Application examples.

1. First Embodiment

[Exemplary Configuration]

Figure 1:
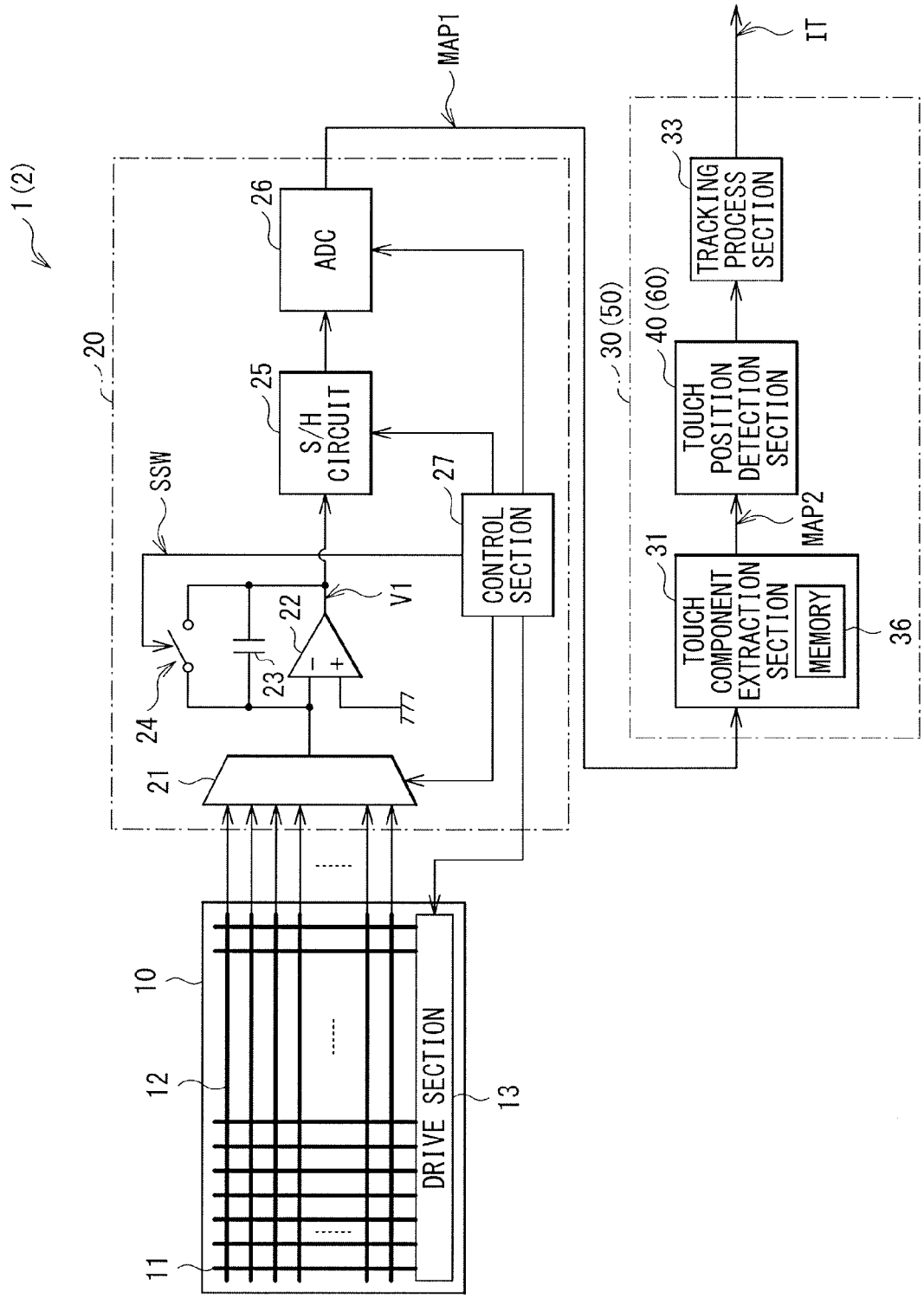
FIG. 1 is a block diagram illustrating an exemplary configuration of a touch panel according to an embodiment of the present disclosure.

FIG. 1 illustrates an exemplary configuration of a touch panel according to a first embodiment. A touch panel 1 may be a capacitance-type touch panel. The touch detection circuit and the touch detection method are embodied by the first embodiment, and are therefore described together. The touch panel 1 includes a touch detection device 10, an analog signal processing section 20, and a digital signal processing section 30.

The touch detection device 10 detects an object (external proximity object), for example, a user finger, that is in contact with or in proximity to a touch detection surface. The touch detection device 10 includes a plurality of drive electrodes 11, a plurality of sensor electrodes 12, and a drive section 13.

The plurality of drive electrodes 11 are each a beltlike electrode, and are arranged side-by-side in a direction intersecting an extending direction thereof. A first end of each drive electrode 11 is connected to the drive section 13 so as to receive a drive signal DRV.

The plurality of sensor electrodes 12 are electrodes extending in a direction intersecting the extending direction of the plurality of drive electrodes 11, and are arranged side-by-side in a direction intersecting the extending direction of the sensor electrodes 12. An intersection of each of the plurality of drive electrodes 11 and each of the plurality of sensor electrodes 12 has capacitance as described later. A first end of each sensor electrode 12 is connected to the analog signal processing section 20.

The drive section 13 sequentially applies a drive signal DRV to the plurality of drive electrodes 11 based on a control signal supplied from the analog signal processing section 20.

Figure 2:
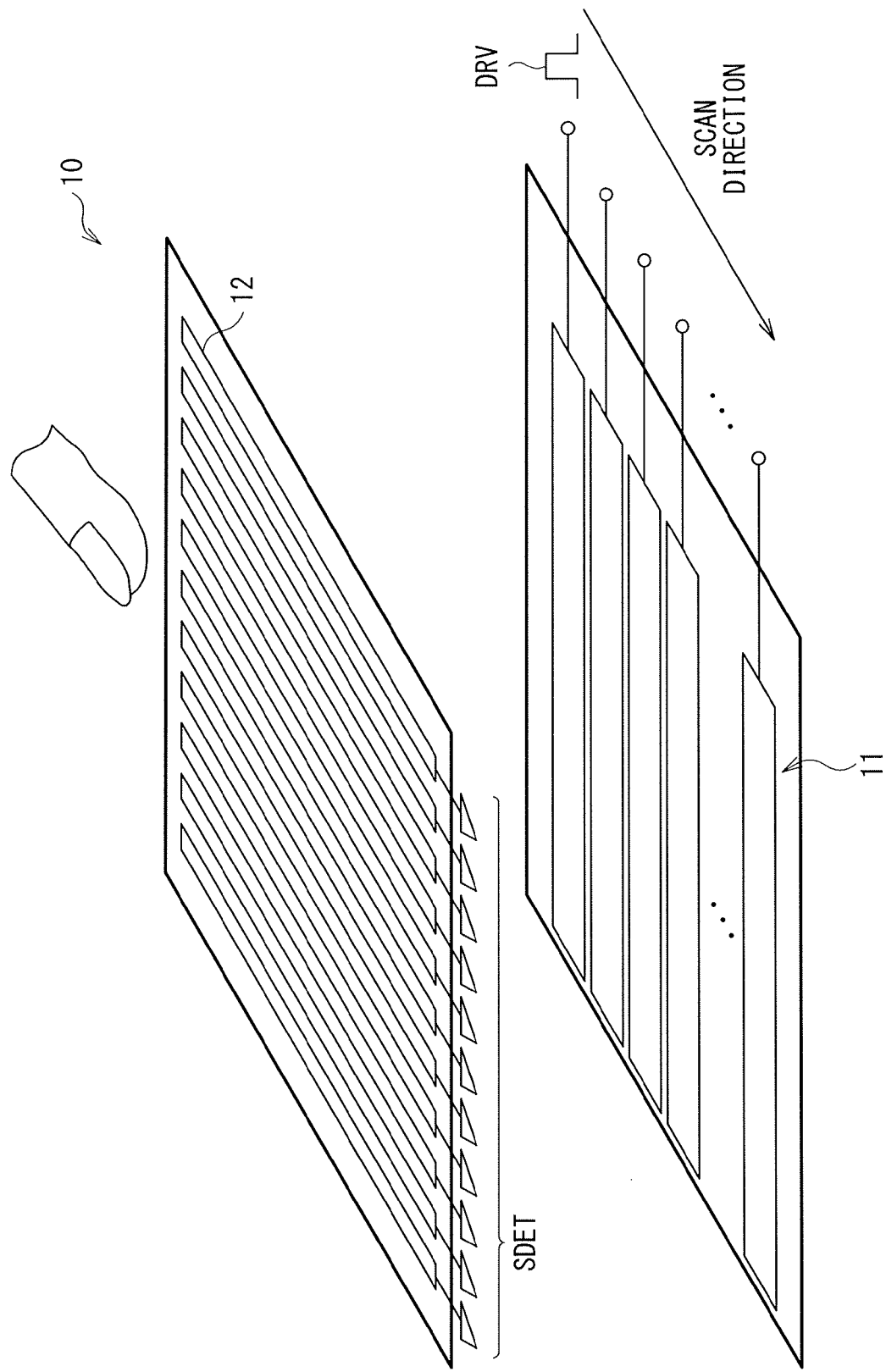
FIG. 2 is a perspective diagram illustrating an exemplary configuration of a touch detection device illustrated in FIG. 1.

FIG. 2 perspectively illustrates an exemplary configuration of the touch detection device 10. In this exemplary case, the drive electrodes 11 are provided so as to extend in a horizontal direction in the drawing, and the sensor electrodes 12 are provided so as to extend in a depth direction in the drawing. The drive electrodes 11 and the sensor electrodes 12 are provided in different layers spaced away from each other. Consequently, an intersection of each of the plurality of drive electrodes 11 and each of the plurality of sensor electrodes 12 form capacitance.

The drive section 13 sequentially supplies the drive signal DRV to the drive electrodes 11 so that scan drive is performed. The drive signal DRV is transmitted to each sensor electrode 12 via the capacitance between each drive electrode 11 and each sensor electrode 12. At this time, a signal (a detection signal SDET) provided by the sensor electrode 12 is in correspondence to a proximate state of an external proximity object. Specifically, when the external proximity object exists, capacitance is also formed between the sensor electrode 12 and the external proximity object in addition to the capacitance between the drive electrode 11 and the sensor electrode 12; hence, the detection signal SDET is varied depending on the proximate state of the external proximity object. The analog signal processing section 20 and the digital signal processing section 30 detect the external proximity object based on such a detection signal SDET.

Thus, in the touch detection device 10, each of the intersections of the plurality of drive electrodes 11 and the plurality of sensor electrodes 12 serves as a capacitance-type touch sensor. In the touch detection device 10, such touch sensors are disposed in a matrix. Consequently, scanning the entire touch detection surface of the touch detection device 10 makes it possible to detect a position (coordinates) at which the external proximity object is into contact with or proximity to the touch detection surface.

The analog signal processing section 20 generates map data MAP1 showing detection results of all the touch sensors of the touch detection device 10 based on the detection signals SDET supplied from the plurality of sensor electrodes 12 of the touch detection device 10. The analog signal processing section 20 includes a multiplexer 21, an operational amplifier 22, a capacitor 23, a switch 24, a sample/hold (S/H) circuit 25, an analog to digital converter (ADC) 26, and a control section 27.

The multiplexer 21 sequentially selects one of the detection signals SDET supplied from the plurality of sensor electrodes 12 of the touch detection device 10 based on a control signal supplied from the control section 27, and outputs the selected one of the detection signals SDET. It is to be noted that this is not limitative. Alternatively, for example, the multiplexer 21 may not be provided, and, for example, circuits of the operational amplifiers 22, etc. may be provided according to the number of the plurality of sensor electrodes 12 of the touch detection device 10 to perform parallel processing.

The operational amplifier 22 amplifies a differential voltage between a voltage of a positive input terminal and a voltage of a negative input terminal, and outputs the amplified differential voltage. In this exemplary case, the positive input terminal is grounded. The negative input terminal is connected to an output terminal of the multiplexer 21, and connected to a first end of the capacitor 23 and a first end of the switch 24. An output terminal of the operational amplifier 22 is connected to a second end of the capacitor 23 and a second end of the switch 24. The capacitor 23 has a first end connected to the negative input terminal of the operational amplifier 22 and a second end connected to an output terminal of the operational amplifier 22. The switch 24 is turned on or off based on a control signal SSW supplied from the control section 27, and has the first end connected to the negative input terminal of the operational amplifier 22 and the second end connected to the output terminal of the operational amplifier 22.

Through such a configuration, during an off period of the switch 24, the operational amplifier 22 and the capacitor 23 integrate the detection signals SDET supplied from the touch detection device 10, and outputs the integrated value as a signal V1. When the switch 24 is turned on, the first and second ends of the capacitor 23 are electrically connected to each other, and the integrated value (the output signal V1 of the operational amplifier 22) is reset.

The S/H circuit 25 samples the output signal V1 of the operational amplifier 22 based on the control signal supplied from the control section 27, and maintains results of the sampling for a certain period.

The ADC 26 converts an output signal, which is an analog signal, of the S/H circuit 25 into a digital code based on the control signal supplied from the control section 27.

The control section 27 is a circuit that supplies the control signal to each of the drive section 13, the multiplexer 21, the switch 24, the S/H circuit 25, and the ADC 26 of the touch detection device 10, and controls such circuits to operate in cooperation with one another.

Figure 3:
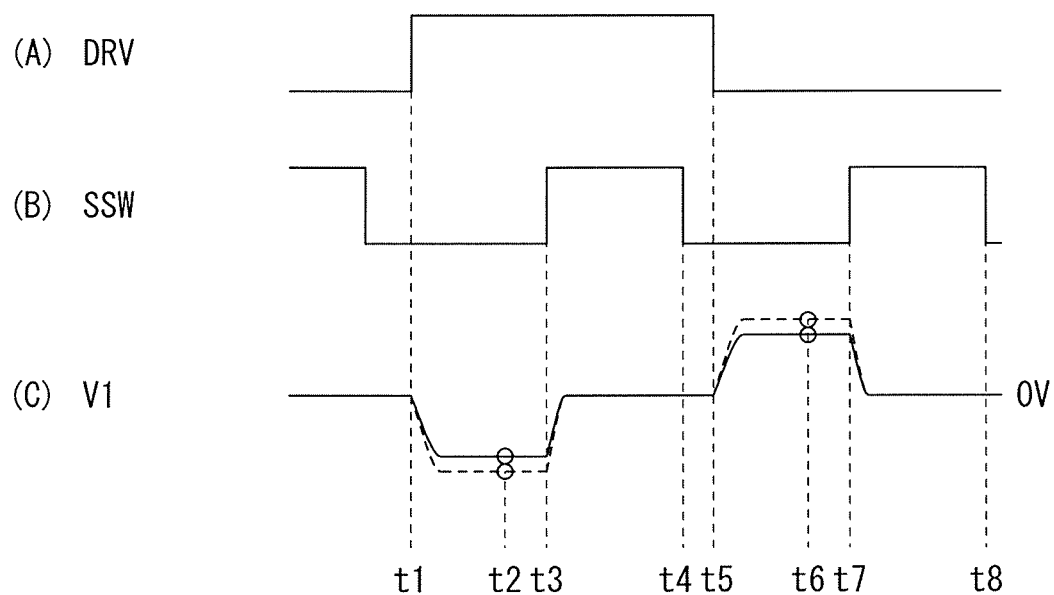
FIG. 3 is a timing waveform chart illustrating an exemplary operation of each of the touch detection device and an analog signal processing section illustrated in FIG. 1.

FIG. 3 illustrates an exemplary operation of each of the touch detection device 10 and the analog signal processing section 20, where (A) illustrates a waveform of the drive signal DRV, (B) illustrates a waveform of the control signal SSW, and (C) illustrates a waveform of the signal V1. In this exemplary case, the switch 24 is on while the control signal SSW is at a high level, and is off while the control signal SSW is at a low level. In (C) of FIG. 3, each solid line illustrates a case where the external proximity object exists, and each broken line illustrates a case where the external proximity object does not exist.

First, at timing t1, the drive section 13 allows voltage of the drive signal DRV, which is to be applied to one drive electrode 11 out of the plurality of drive electrodes 11, to transit from a low level to a high level ((A) of FIG. 3). The drive signal DRV is transmitted to the sensor electrode 12 via the capacitance between the drive electrode 11 and the sensor electrode 12, and is outputted as the detection signal SDET from the touch detection device 10. The operational amplifier 22 and the capacitor 23 integrate such detection signals SDET, so that the output signal V1 is lowered to have a voltage corresponding to a proximate state of the external proximity object ((C) of FIG. 3).

At timing t2, the S/H circuit 25 samples the signal V1, and the ADC 26 converts the output signal of the S/H circuit 25 into a digital code ((C) of FIG. 3).

Subsequently, at timing t3, the control section 27 changes voltage of the control signal SSW from a low level to a high level ((B) of FIG. 3). Consequently, the switch 24 is turned on, the output signal V1 of the operational amplifier 22 is set to 0 V, and the integrated value is reset ((C) of FIG. 3).

Subsequently, at timing t4, the control section 27 changes the voltage of the control signal SSW from the high level to the low level ((B) of FIG. 3). Consequently, the switch 24 is turned off, and the operational amplifier 22 and the capacitor 23 are allowed to perform integration operation.

Subsequently, at timing t5, the drive section 13 allows the voltage of the drive signal DRV to transit from the high level to the low level ((A) of FIG. 3). Accordingly, as with the period after the timing t1, the operational amplifier 22 and the capacitor 23 integrate the detection signals SDET, and the signal V1 is set to have a voltage corresponding to the proximate state of the external proximity object. At timing t6, the S/H circuit 25 samples the signal V1, and the ADC 26 converts the output signal of the S/H circuit 25 into a digital code ((C) of FIG. 3). In a period from timing t7 to timing t8, the integrated value is reset ((C) of FIG. 3).

In this way, the analog signal processing section 20 generates each digital code based on the detection signal SDET of each touch sensor of the touch detection device 10. The analog signal processing section 20 outputs such digital codes as map data MAP1 configured of digital codes of all the touch sensors on the touch detection surface.

The digital signal processing section 30 obtains factors such as the number of touches, a position of each touch, variation of each touch position, and which touches are made by the same user based on the map data MAP1 supplied from the analog signal processing section 20. The digital signal processing section 30 includes a touch component extraction section 31, a touch position detection section 40, and a tracking process section 33.

The touch component extraction section 31 generates map data MAP2 on a component (touch component TC) based on the external proximity object on the basis of the map data MAP1. The touch component extraction section 31 includes a memory 36. The memory 36 stores map data MAP0 in the case of no external proximity object. In this configuration, first, the touch component extraction section 31 stores digital codes, which are determined to be digital codes in the case of no external proximity object in the map data MAP1 supplied from the analog signal processing section 20, in a form of the map data MAP0 into the memory 36 in advance. The touch component extraction section 31 then obtains a difference between each digital code in the map data MAP1 supplied from the analog signal processing section 20 and each digital code in the map data MAP0 stored in the memory 36. The touch component extraction section 31 calculates, based on this difference, a signal component SC containing a touch component TC that has a small value, nearly 0 (zero), in the case of no external proximity object and has a larger value with a closer external proximity object, and generates the map data MAP2.

An example of the map data MAP2 in the case of multi-touch is now described.

Figure 4A:
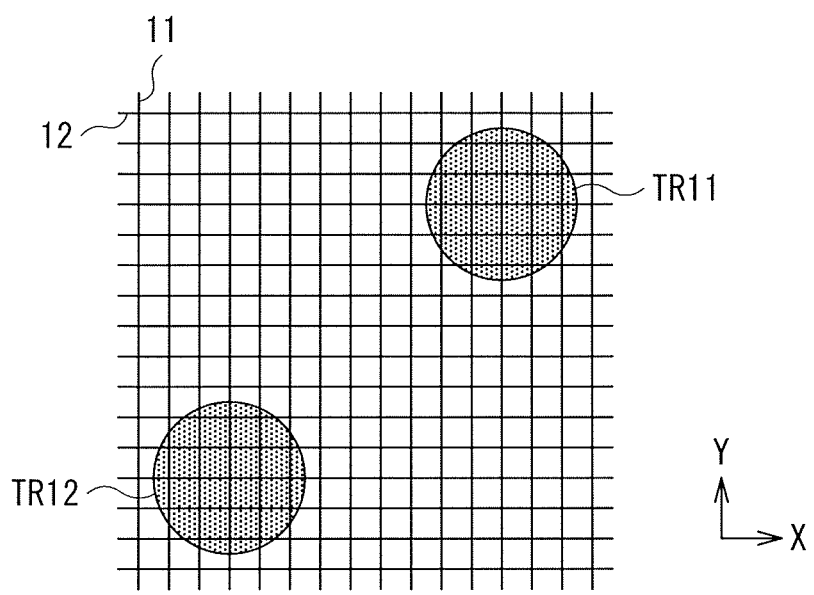
FIG. 4A is an explanatory diagram illustrating an example of a map data illustrated in FIG. 1.
Figure 4B:
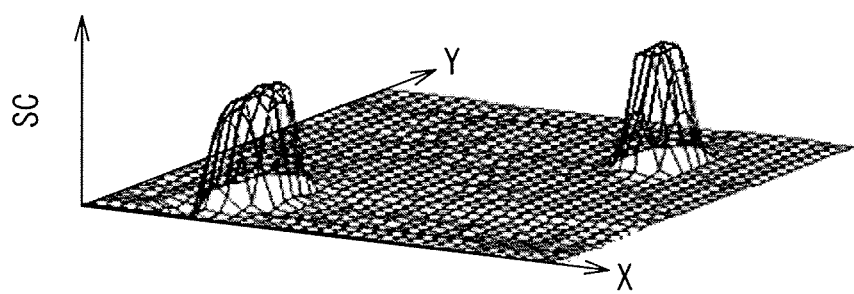
FIG. 4B is another explanatory diagram illustrating an example of the map data illustrated in FIG. 1.
Figure 5A:
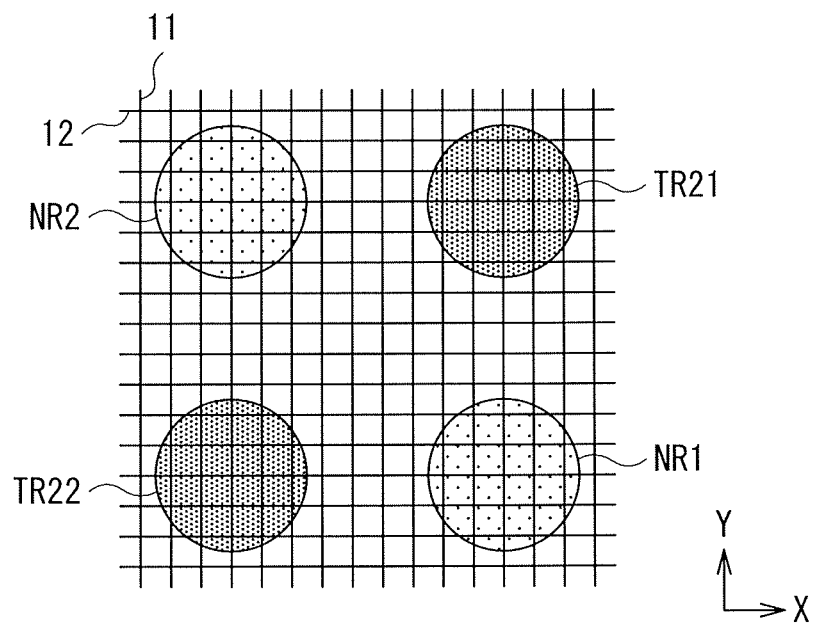
FIG. 5A is an explanatory diagram illustrating another example of the map data illustrated in FIG. 1.
Figure 5B:
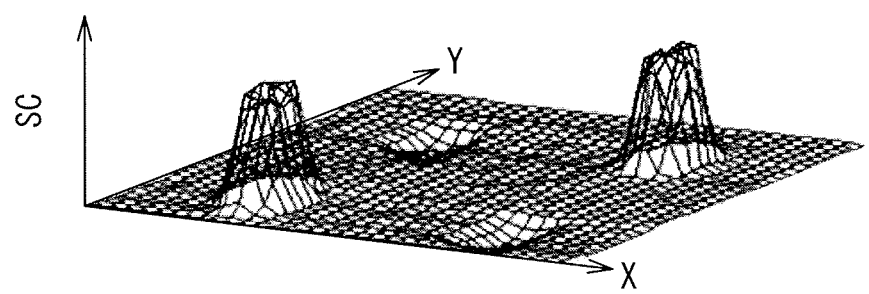
FIG. 5B is another explanatory diagram illustrating another example of the map data illustrated in FIG. 1.

FIGS. 4A and 4B each illustrate the map data MAP2 in the case where two users each touch the touch panel with one finger (case C1), where FIG. 4A shows a region (touch region TR) for each touch, and FIG. 4B shows the signal component SC of the map data MAP2. FIGS. 5A and 5B each illustrate the map data MAP2 in the case where one user touches the touch panel with two fingers (case C2), where FIG. 5A shows the touch region TR, and FIG. 5B shows the signal component SC of the map data MAP2. FIGS. 4A, 4B, 5A and 5B each show the neighborhood of each touch region TR in the map data MAP2.

In the case C1, two users each touch the touch panel with one finger, thereby two touch regions TR11 and TR12 are formed as illustrated in FIG. 4A. In the touch regions TR11 and TR12, as illustrated in FIG. 4B, the signal component SC has a positive value. In other words, the positive signal component SC corresponds to the touch component TC.

Similarly, in the case C2, one user touches the touch panel with two fingers, thereby two touch regions TR21 and TR22, in which the signal component SC has a positive value, are formed as illustrated in FIGS. 5A and 5B. At this time, in the case C2, unlike in the case C1, two regions (negative regions NR1 and NR2), in which the signal component SC has a negative value, are formed in addition to the touch regions TR21 and TR22. A position in an x-axis direction of the negative region NR1 is substantially equal to a position in the x-axis direction of the touch region TR21, and a position in a y-axis direction of the negative region NR1 is substantially equal to a position in the y-axis direction of the touch region TR22. A position in the x-axis direction of the negative region NR2 is substantially equal to a position in the x-axis direction of the touch region TR22, and a position in the y-axis direction of the negative region NR2 is substantially equal to a position in the y-axis direction of the touch region TR21.

In this way, in the case C2, the negative regions NR1 and NR2 are formed in addition to the touch regions TR21 and TR22. This is because a user operating the touch panel is in general insufficiently grounded, and the two fingers of the user act as a signal path. Specifically, for example, the negative region NR1 may be caused by transmission of the drive signal DRV applied to each drive electrode 11 in the touch region TR21 to each sensor electrode 12 in the touch region TR22 via the two fingers of the user. In addition, for example, the negative region NR2 may be caused by transmission of the drive signal DRV applied to each drive electrode 11 in the touch region TR22 to each sensor electrode 12 in the touch region TR21 via the two fingers of the user.

In this way, the touch panel 1 uses a fact that no negative region is formed when a plurality of users each touch the touch panel with one finger (case C1), and the negative region is formed when one user touches the touch panel with a plurality of fingers (case C2), so that the touch panel 1 is allowed to detect which touches, among a plurality of touches, are made by the same user as described below.

The touch position detection section 40 detects factors such as the number of touches, a position of each touch, and which touches are made by the same user based on the map data MAP2.

Figure 6:
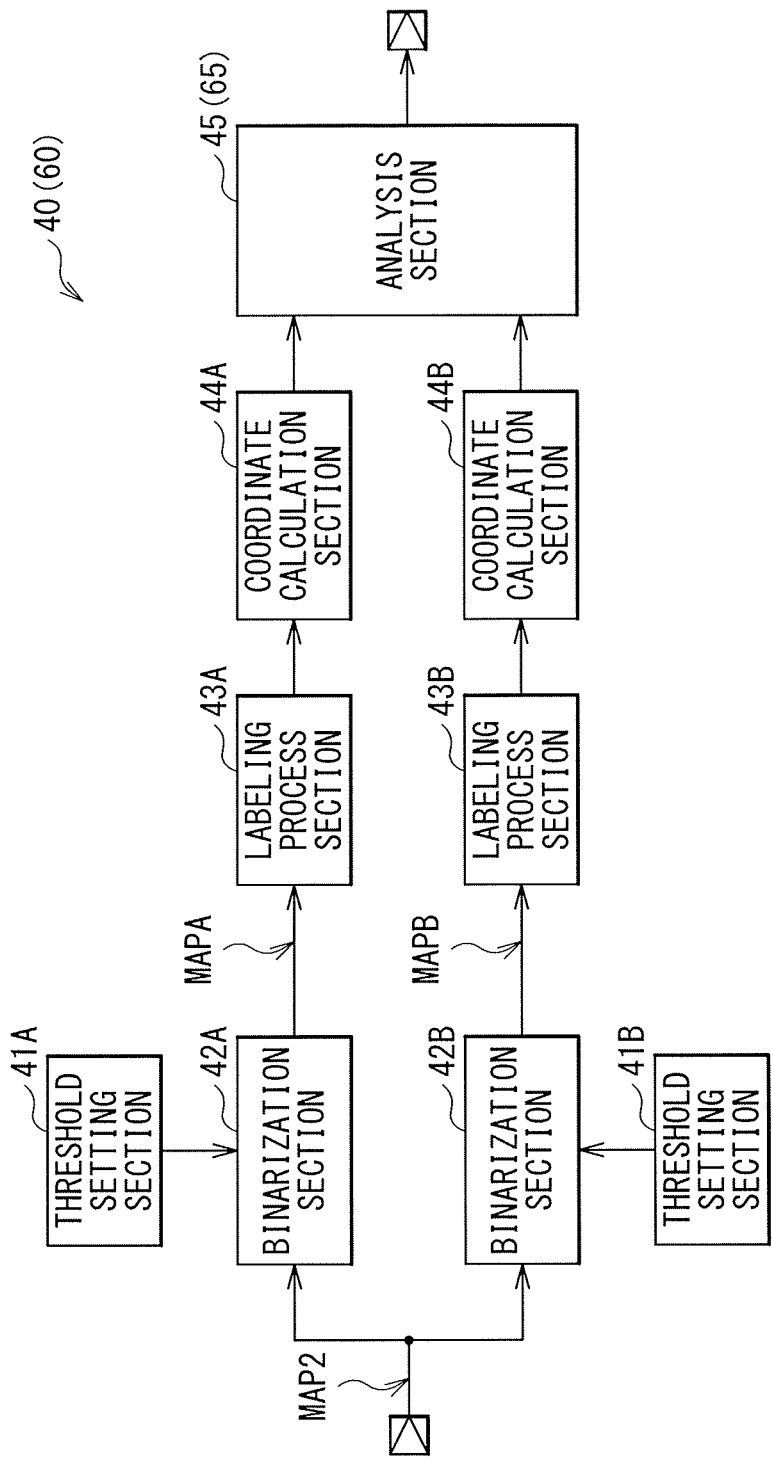
FIG. 6 is a block diagram illustrating an exemplary configuration of a touch position detection section illustrated in FIG. 1.

FIG. 6 illustrates an exemplary configuration of the touch position detection section 40. The touch position detection section 40 includes threshold setting sections 41A and 41B, binarization sections 42A and 42B, labeling process sections 43A and 43B, coordinate calculation sections 44A and 44B, and an analysis section 45.

The threshold setting section 41A generates a positive threshold THP, and supplies the positive threshold THP to the binarization section 42A.

The binarization section 42A performs binarization processing based on the map data MAP2 through comparing the signal component SC contained in the map data MAP2 with the positive threshold THP to remove Gaussian noise. The binarization section 42A outputs results of the binarization processing as map data MAPA. In other words, the map data MAPA shows the touch regions TR (the touch regions TR21 and TR22 illustrated in FIGS. 4A and 5A).

The labeling process section 43A performs a labeling process based on the map data MAPA. Specifically, the labeling process section 43A applies different labels to the respective touch regions TR contained in the map data MAPA. The labeling process section 43A supplies, together with the map data MAPA, label information LA indicating a relationship between each touch region TR and each label to the coordinate calculation section 44A.

The coordinate calculation section 44A obtains the coordinates (a touch position) of each touch point TP through so-called barycentric processing based on the map data MAPA and the label information LA, and outputs coordinates of each touch point TP together with the number of touch points TP.

The threshold setting section 41B generates negative threshold THN, and supplies the negative threshold THN to the binarization section 42B.

As with the binarization section 42A, the binarization section 42B performs binarization processing based on the map data MAP2 through comparing the signal component SC contained in the map data MAP2 with the negative threshold THN, and outputs results of the binarization processing as map data MAPB. In other words, the map data MAPB shows the negative regions NR (the negative regions NR1 and NR2 illustrated in FIG. 5A).

As with the labeling process section 43A, the labeling process section 43B performs a labeling process based on the map data MAPB, and supplies, together with the map data MAPB, label information LB indicating a relationship between each negative region NR and each label to the coordinate calculation section 44B.

As with the coordinate calculation section 44A, the coordinate calculation section 44B obtains the coordinates of each negative point NP through so-called barycentric processing based on the map data MAPB and the label information LB, and outputs the coordinates of each negative point NP together with the number of negative points NP.

As described later, the analysis section 45 analyzes which touches are made by the same user based on the coordinates of each touch point TP supplied from the coordinate calculation section 44A and the coordinates of each negative point NP supplied from the coordinate calculation section 44B. In addition, the analysis section 45 generates user information IU indicating factors such as a relationship between each touch and a user and the number of users, and outputs the user information IU together with the coordinates of each touch point TP and the number of touch points TP.

The tracking process section 33 performs a tracking process based on the coordinates of each touch point TP and the number of touch points TP detected by the touch position detection section 40 and on the user information IU to determine variation of each touch position. Specifically, the tracking process section 33 performs so-called neighborhood processing to associate each touch position obtained through the most recent scan with each touch position obtained through a prior scan, for example. Consequently, the tracking process section 33 obtains variation of each touch position. In addition, the tracking process section 33 outputs, as touch information IT, information on the number of touches and touch positions and the user information IU.

Figure 7:
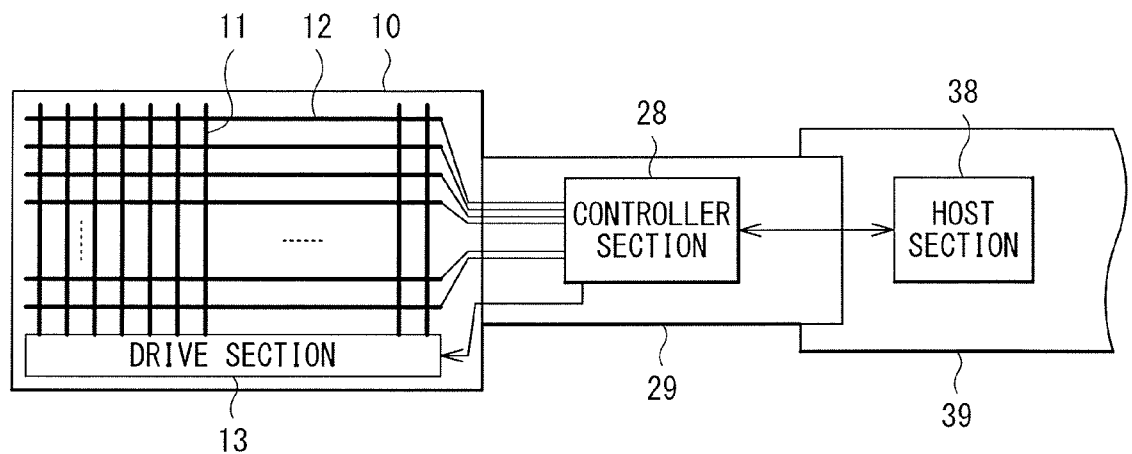
FIG. 7 is an explanatory diagram illustrating a mounting example of the touch panel illustrated in FIG. 1.

FIG. 7 illustrates a mounting example of the touch panel 1. In this example, the analog signal processing section 20 is mounted as a controller section 28 on a flexible printed circuit board 29, and the digital signal processing section 30 is mounted as a host section 38 on a substrate 39. It is to be noted that this is not limitative, and, for example, part or all of the digital signal processing section 30 may be mounted as the controller section 28 together with the analog signal processing section 20.

The map data MAP2 corresponds to a specific but not limitative example of "touch data map" in one embodiment of the disclosure. The binarization section 42A, the labeling process section 43A, and the coordinate calculation section 44A collectively correspond to a specific but not limitative example of "touch detection section" in one embodiment of the disclosure. The binarization section 42B, the labeling process section 43B, the coordinate calculation section 44B, and the analysis section 45 collectively corresponds to a specific but not limitative example of "determination section" in one embodiment of the disclosure.

[Operation and Functions]

Operation and functions of the touch panel 1 of the first embodiment are now described.

(Summary of Overall Operation)

First, summary of overall operation of the touch panel 1 is described with reference to FIGS. 1, 6, etc. The drive section 13 sequentially applies the drive signal DRV to each of the plurality of drive electrodes 11 based on the control signal supplied from the control section 27. The drive signal DRV is transmitted to each sensor electrode 12 via the capacitance between each drive electrode 11 and each sensor electrode 12, and is output as the detection signal SDET from the touch detection device 10. The analog signal processing section 20 generates the map data MAP1 indicating the detection results of all the touch sensors on the touch detection surface of the touch detection device 10 based on the detection signals SDET supplied from the plurality of sensor electrodes 12 of the touch detection device 10.

The touch component extraction section 31 generates, on the basis of the map data MAP1, the map data MAP2 on the signal component SC containing a component (the touch component TC) based on the external proximity object. The threshold setting section 41A of the touch position detection section 40 generates the positive threshold THP. The binarization section 42A performs binarization processing through comparing the signal component SC contained in the map data MAP2 with the positive threshold THP to generate the map data MAPA. The labeling process section 43A generates label information LA through a labeling process based on the map data MAPA. The coordinate calculation section 44A obtains coordinates (a touch position) of each touch point TP through barycentric processing based on the map data MAPA and the label information LA, and outputs the coordinates of each touch point TP together with the number of touch points TP. The threshold setting section 41B generates the negative threshold THN. The binarization section 42B performs binarization processing through comparing the signal component SC contained in the map data MAP2 with the negative threshold THN to generate the map data MAPB. The labeling process section 43B performs a labeling process based on the map data MAPB to generate the label information LB. The coordinate calculation section 44B obtains coordinates of each negative point NP through barycentric processing based on the map data MAPB and the label information LB, and outputs the coordinates of each negative point NP together with the number of negative points NP. The analysis section 45 analyzes which touches are made by the same user based on the coordinates of each touch point TP supplied from the coordinate calculation section 44A and the coordinates of each negative point NP supplied from the coordinate calculation section 44B. In addition, the analysis section 45 generates the user information IU indicating factors such as a relationship between each touch and a user and the number of users, and outputs the user information IU together with the coordinates of each touch point TP and the number of touch points TP. The tracking process section 33 performs a tracking process based on the coordinates of each touch point TP and the number of touch points TP and on the user information IU to obtain variation of each touch position, and generates the touch information IT.

(Detailed Operation of Analysis Section 45)

The analysis section 45 analyzes which touches are made by the same user based on the coordinates of each touch point TP supplied from the coordinate calculation section 44A and the coordinates of each negative point NP supplied from the coordinate calculation section 44B. Such operation is described in detail below.

Figure 8:
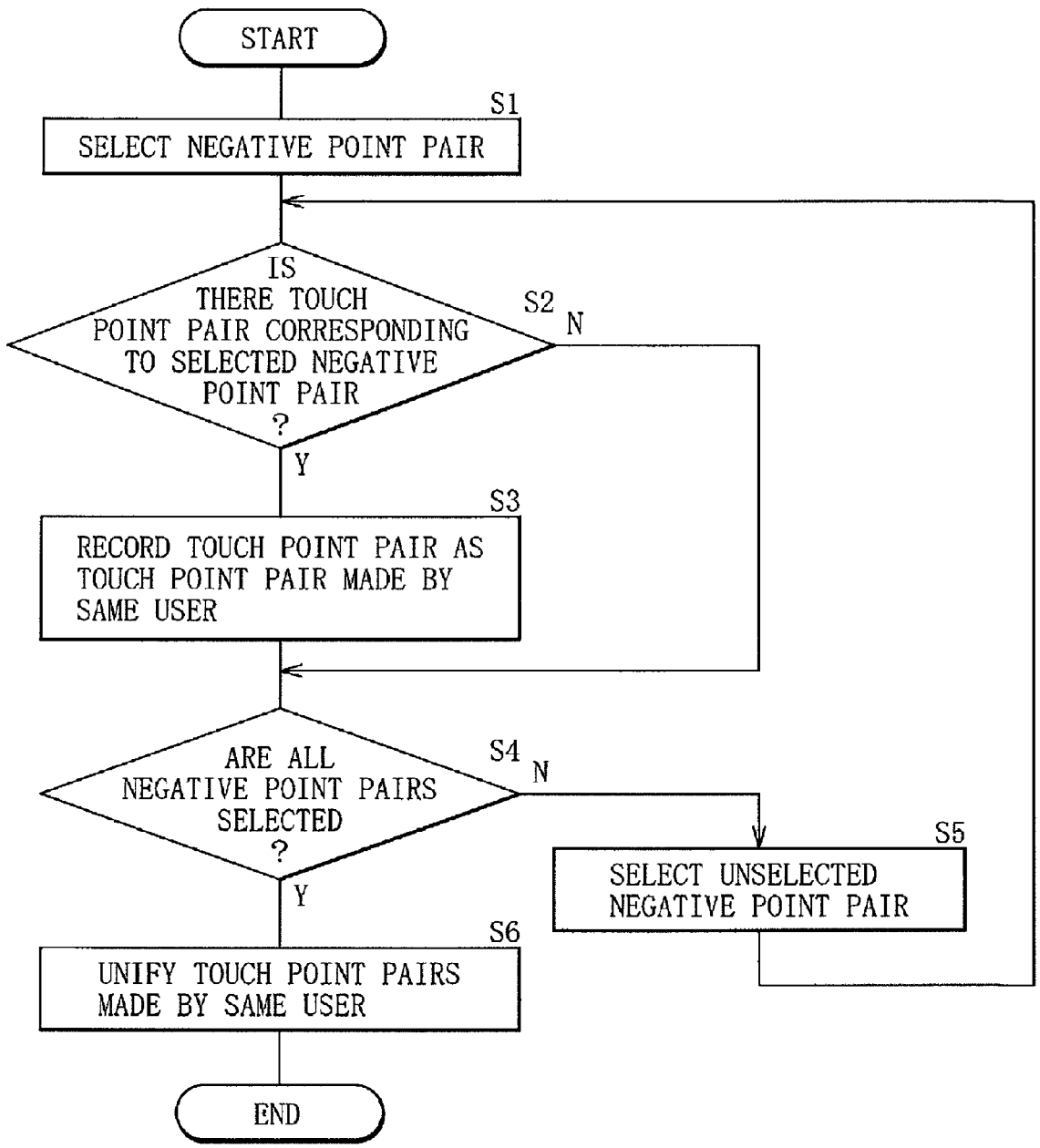
FIG. 8 is a flowchart illustrating an exemplary operation of an analysis section illustrated in FIG. 6.

FIG. 8 illustrates a flowchart of operation of the analysis section 45. Every time the binarization sections 42A and 42B, the labeling process sections 43A and 43B, and the coordinate calculation sections 44A and 44B perform processing based on one map data MAP2 to supply the coordinates of each touch point TP and the coordinates of each negative point NP to the analysis section 45, the analysis section 45 performs the following flow.

First, the analysis section 45 selects a pair of negative points NP (a negative point pair) among all the negative points NP (step S1).

Subsequently, the analysis section 45 checks whether or not there is a pair of touch points TP (a touch point pair) corresponding to the negative point pair selected in step S1 (step S2). Specifically, the analysis section 45 checks whether or not the touch point TP exists at each of a position specified by an x coordinate of a first negative point NP of the negative point pair and a y coordinate of a second negative point NP thereof, and a position specified by an x coordinate of the second negative point NP and a y coordinate of the first negative point NP thereof. If there is no touch point pair corresponding to the selected negative point pair, the flow is advanced to step S4.

If there is a touch point pair corresponding to the selected negative point pair in the step S2, the analysis section 45 records the touch point pair as a touch point pair made by the same user (step S3).

Subsequently, the analysis section 45 checks whether all negative point pairs have been selected or not (step S4). If not all the negative point pairs have been selected, the analysis section 45 selects an unselected negative point pair (step S5), and the flow is advanced to step S2. The analysis section 45 repeats the steps S2 to S5 until all the negative point pairs are selected.

If all the negative point pairs have been selected in the step S4, the analysis section 45 unifies the touch point pairs made by the same user (step S6). Specifically, for example, when one user touches the touch panel with three fingers, three touch points TP are formed. As a result, three touch point pairs are formed, each touch point pair being configured of two touch points TP out of the three touch points TP. In other words, in the step S2, the three touch point pairs are recorded as touch point pairs made by the same user. Consequently, the analysis section 45 unifies the three touch point pairs, and rerecords the three touch points TP as touch point pairs made by the same user.

This is the end of the flow.

Operation of the analysis section 45 is now described with several specific examples.

Figure 9:
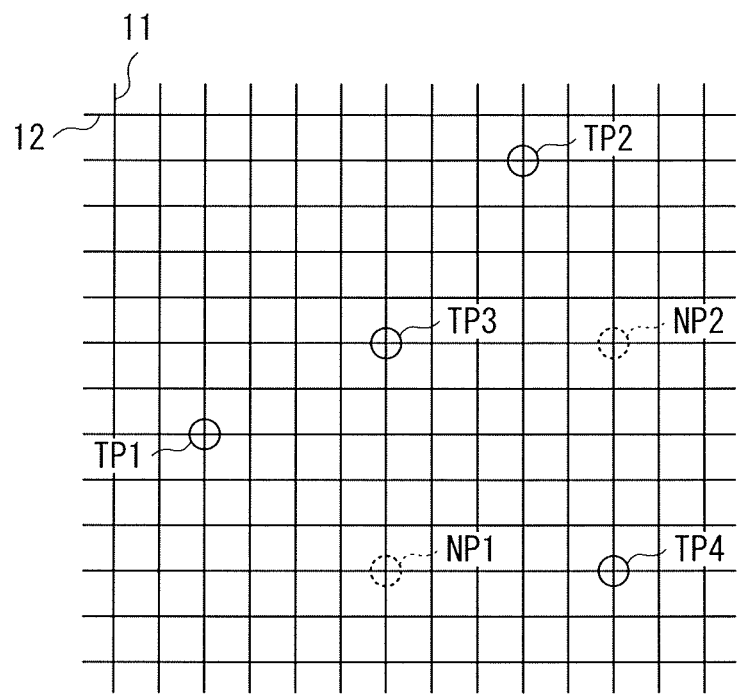
FIG. 9 is an explanatory diagram illustrating an exemplary operation of the analysis section illustrated in FIG. 6.

FIG. 9 illustrates coordinates of each of the touch points TP and the negative points NP in specific example 1. The coordinates of each of the touch points TP and the negative points NP are obtained through barycentric processing by the coordinate calculation sections 44A and 44B. Although each of the touch points TP and the negative points NP may be formed at a place other than the intersection of each drive electrode 11 and each sensor electrode 12, the touch points TP and the negative points NP are shown to be at intersections of the drive electrodes 11 and the sensor electrodes 12 in the following description for convenience of explanation.

In the specific example 1, three users U1 to U3 operate the touch panel 1. A touch point TP1 indicates a touch made by the user U1, a touch point TP2 indicates a touch made by the user U2, and touch points TP3 and TP4 indicate touches made by the user U3. In other words, the user U3 operates the touch panel 1 with two fingers. Consequently, a pair of negative points NP1 and NP2 corresponding to a pair of touch points TP2 and TP3 are provided.

First, the analysis section 45 determines the negative points NP1 and NP2 as a negative point pair (step S1). Since a touch point pair configured of touch points TP3 and TP4 exist at positions corresponding to the negative point pair (step S2), the analysis section 45 records the touch point pair configured of the touch points TP3 and TP4 as a touch point pair made by the same user (step S3). In the specific example 1, since there are two negative points NP (negative points NP1 and NP2), one negative point pair exists (step S4). In addition, since one user makes one touch point pair, the analysis section 45 does not unify the touch point pairs (step S5), and the flow is finished.

Through such steps, the analysis section 45 detects that the touch points TP3 and TP4 are made by the same user, and there are three users (a user for the touch point TP1, a user for the touch point TP2, and a user for the touch points TP3 and TP4).

Figure 10:
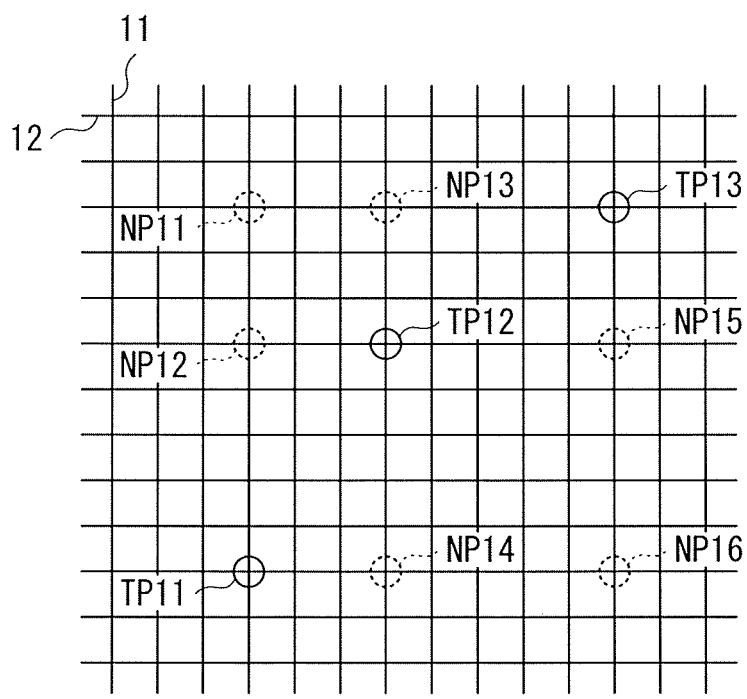
FIG. 10 is an explanatory diagram illustrating another exemplary operation of the analysis section illustrated in FIG. 6.

FIG. 10 illustrates coordinates of each of the touch points TP and the negative points NP in specific example 2. In the specific example 2, one user U1 operates the touch panel 1 with three fingers (corresponding to touch points TP11 to TP13). Consequently, a pair of negative points NP12 and NP14 are formed in correspondence to a pair of touch points TP11 and TP12, a pair of negative points NP11 and NP16 are formed in correspondence to a pair of touch points TP11 and TP13, and a pair of negative points NP13 and NP15 are formed in correspondence to a pair of touch points TP12 and TP13.

First, the analysis section 45 selects a pair of negative points NP11 and NP12 as a negative point pair out of a plurality of negative points NP11 to NP16 (step S1). Since no touch point pair exists at positions corresponding to the negative point pair (step S2), the analysis section 45 subsequently selects a pair of negative points NP11 and NP12 as the negative point pair (step S5). In this way, the analysis section 45 sequentially selects a negative point pair from the negative points NP11 to NP16, and checks whether the touch point pair exists or not. At this time, the analysis section 45 records a touch point pair (TP11, TP13) corresponding to a negative point pair configured of the negative points NP11 and NP16, a touch point pair (TP11, TP12) corresponding to a negative point pair configured of the negative points NP12 and NP14, and a touch point pair (TP12, TP13) corresponding to a negative point pair configured of the negative points NP13 and NP15 as touch point pairs that are each made by the same user (steps S1 to S5). Subsequently, since the touch points TP11 and TP13, the touch points TP11 and TP12, and the touch points TP12 and TP13 are each made by the same user, the analysis section 45 unifies the touch point pairs of such touch points, and rerecords such three touch points TP11 to TP13 as touch points made by the same user.

Through such steps, the analysis section 45 detects that the touch points TP11 to TP13 are made by the same user, and there is one user.

In this way, the touch panel 1 detects not only coordinates of each touch point TP but also coordinates of each negative point NP, and is therefore allowed to determine which touches are made by the same user.

Moreover, the touch panel 1 selects a negative point pair, and checks whether a touch point pair corresponding to the selected negative point pair exists or not, which allows arithmetic processing throughput to be reduced. Specifically, it is considered that one or more users each typically operate the touch panel with one or two finger in many cases. In such a case, the number of negative points NP is equal to or smaller than the number of touch points TP. Consequently, the touch panel 1 makes it possible to reduce arithmetic processing throughput compared with, for example, a case (Modification 1-1 described later) where a touch point pair is selected, and whether a negative point pair corresponding to the selected touch point pair exists or not is checked.

(Detailed Operation of Tracking Process Section 33)

The tracking process section 33 performs a tracking process based on the coordinates of each touch point TP and the number of touch points TP detected by the touch position detection section 40 and on the user information IU to obtain variation of each touch position. Specifically, the tracking process section 33 may perform so-called neighborhood processing to associate, for example, each touch position obtained through the most recent scan with each touch position obtained through prior scan, and thus may obtain variation of each touch position. At this time, even if a plurality of (in the specific example 2, two) touch points TP made by the same user are determined as touch points TP made by different users in a certain scan, the tracking process section 33 corrects such determination using determination results in a previous scan. This operation is described in detail below.

Figure 11:
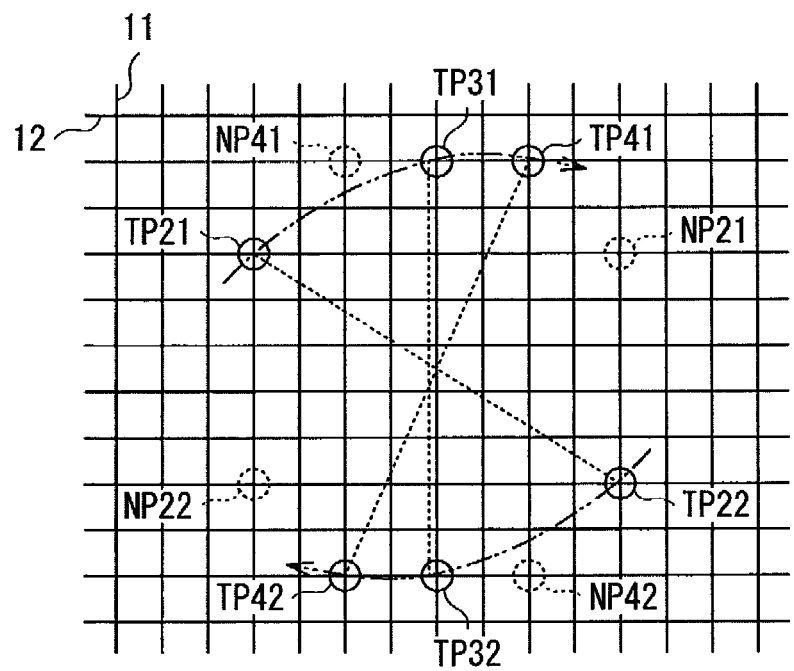
FIG. 11 is an explanatory diagram illustrating an exemplary operation of the touch panel illustrated in FIG. 1.

FIG. 11 illustrates temporal variation of the touch point TP. In this exemplary case, one user operates the touch panel 1 with two fingers. Two touch points TP21 and TP22 are detected in a scan (at timing t11), two touch points TP31 and TP32 are detected in a subsequent scan (at timing t12), and two touch points TP41 and TP42 are detected in a further subsequent scan (at timing t13). The tracking process section 33 associates the touch points TP21, TP31, and TP41 with one another and thus detects movement of one touch point TP, and associates the touch points TP22, TP32, and TP42 with one another and thus detects movement of another touch point TP.

At this time, at the timing t11, a pair of negative points NP21 and NP22 are formed in correspondence to the pair of touch points TP21 and TP22. Hence, the analysis section 45 records the touch point pair configured of the touch points TP21 and TP22 as a touch point pair made by the same user.

Similarly, at the timing t13, a pair of negative points NP41 and NP42 are formed in correspondence to the pair of touch points TP41 and TP42. Hence, the analysis section 45 records the touch point pair configured of the touch points TP41 and TP42 as a touch point pair made by the same user.

However, at the timing t12, two touch points TP31 and TP32 are located on the same drive electrode 11, and positions, at which a pair of negative points NP corresponding to the pair of touch points TP31 and TP32 are to be formed, are substantially superposed on positions of such touch points TP31 and TP32. Hence, no negative point NP is formed. While the two touch points TP31 and TP32 are located on the same drive electrode 11 in this exemplary case, the negative point NP is also not formed when the two touch points TP31 and TP32 are located on the same sensor electrode 12. Consequently, the analysis section 45 determines that the touch points TP31 and TP32 are made by different users.

The tracking process section 33 detects that one touch point TP travels in a sequence of the touch points TP21, TP31, and TP41, and another touch point TP travels in a sequence of the touch points TP22, TP32, and TP42, and then analyzes results of determination by the analysis section 45 on whether the two touch points TP are made by the same user or not, and corrects the determination.

Figure 12:
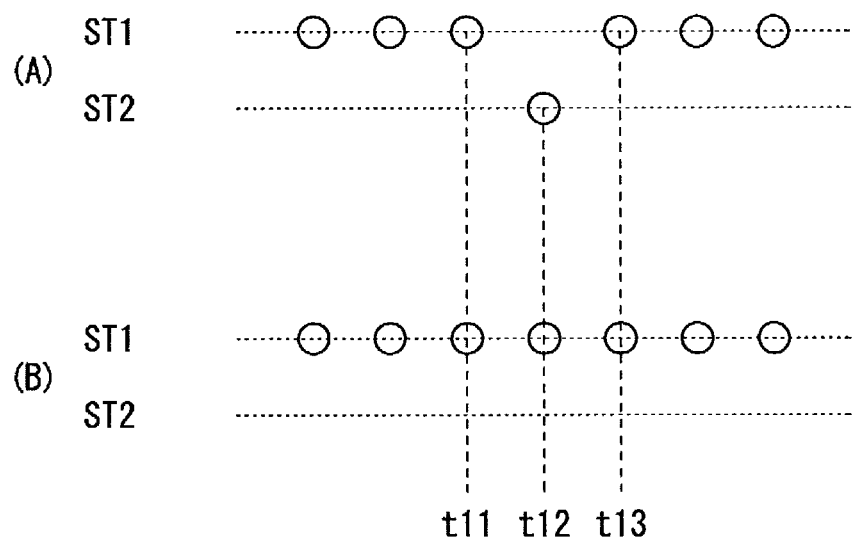
FIG. 12 is an explanatory diagram illustrating an exemplary operation of a tracking process section illustrated in FIG. 1.

FIG. 12 illustrates operation of the tracking process section 33, where (A) illustrates determination result on whether two touch points TP are made by the same user or not, and (B) illustrates correction results by the tracking process section 33. A state ST1 shows that two touch points TP are made by the same user, and a state ST2 shows that two touch points TP are made by different users.

As illustrated in (A) of FIG. 12, the analysis section 45 determines that a state at timing t11 is the state ST1, a state at timing t12 is the state ST2, and a state at timing t13 is the state ST3. The tracking process section 33 may filter such determination results with, for example, a low-pass filter configured of an infinite impulse response (BR) filter, thereby may correct the determination results of the analysis section 45 ((B) of FIG. 12). Consequently, at the timing t12, the two touch points TP are determined to be made by the same user.

In this way, the tracking process section 33 corrects the determination results of the analysis section 45 with determination results in a previous scan. This makes it possible to reduce a possibility of occurrence of erroneous detection where when two touch points TP made by the same user are located on the same drive electrode 11 or the same sensor electrode 12, the touch points TP are determined to be made by different users.

(Exemplary Operation of Touch Panel 1)

In this way, the touch panel 1 makes it possible to detect which touches are made by the same user in the case of multi-touch. Consequently, it is possible to more accurately grasp user intention as described below. Hence, applying the touch panel 1 to an electronic apparatus, for example, a smartphone allows a user interface function of the electronic apparatus to be improved.

Figure 13A:
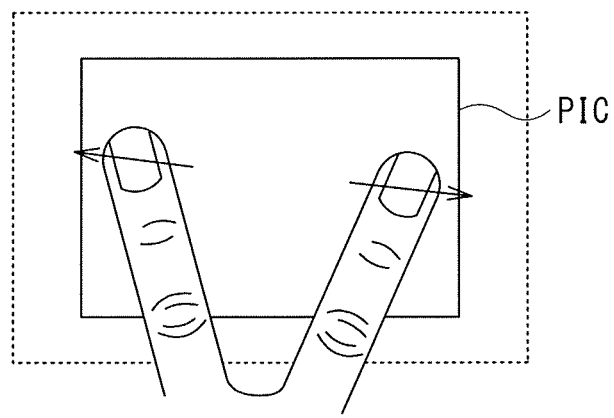
FIG. 13A is an explanatory diagram for explaining an exemplary operation of the touch panel illustrated in FIG. 1.
Figure 13B:
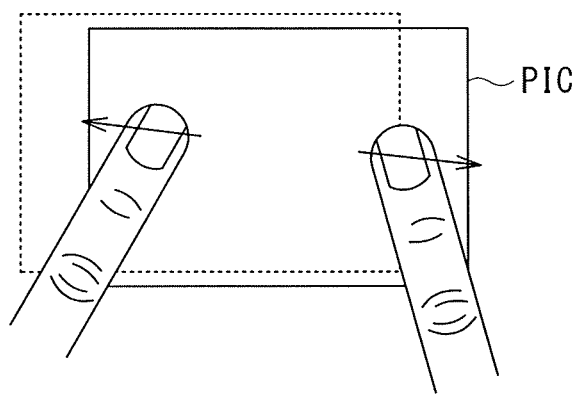
FIG. 13B is an explanatory diagram for explaining another exemplary operation of the touch panel illustrated in FIG. 1.

FIG. 13A illustrates a case where one user performs operation with two fingers on an image PIC displayed on an electronic apparatus. FIG. 13B illustrates a case where two users each perform operation with a finger on the image PIC. In this exemplary case, in each of the cases of FIGS. 13A and 13B, the two touch points TP travel to be spaced away from each other.

In the example of FIG. 13A, since one user performs operation with two fingers, a pair of negative points NP corresponding to a pair of touch points TP are formed. Consequently, the touch panel 1 determines that such two touch points TP are made by the same user. The electronic apparatus determines that the user intends to expand the image PIC since the two touch points TP made by the same user travel to be spaced away from each other. The electronic apparatus displays the image PIC in an expanded manner.

In the example of FIG. 13B, since two users each perform operation with a finger, a pair of negative points NP are not formed, and the touch panel 1 determines that such two touch points TP are made by different users. The electronic apparatus determines that the users intend to move the image PIC since the two touch points TP made by the different users travel to be spaced away from each other. The electronic apparatus may make one touch point TP out of the two touch points TP to be valid based on, for example, results of the tracking process on each touch point TP, and may move the image PIC.

In this way, the touch panel 1 makes it possible to detect which touches are made by the same user, allowing user intention to be more accurately grasped. It is therefore possible to improve a user interface function.

[Effects]

As described above, in the first embodiment, not only the coordinates of each touch point but also the coordinates of each negative point are detected. This makes it possible to determine which touches are made by the same user, leading to improvement in user interface function.

Furthermore, in the first embodiment, a negative point pair may be selected, and whether a touch point pair corresponding to the selected negative point pair exists or not may be checked, which allows arithmetic processing throughput to be reduced.

Moreover, in the first embodiment, the results of determination of the analysis section on whether the two touch points are made by the same user or not may be corrected by the tracking process section using determination results in a previous scan. This makes it possible to reduce possibility of occurrence of erroneous detection.

[Modification 1-1]

Although, as illustrated in FIG. 8, in the first embodiment, a negative point pair may be selected, and whether a touch point pair corresponding to the selected negative point pair exists or not may be checked, this is not limitative. Alternatively, for example, a touch point pair may be selected, and whether a negative point pair corresponding to the selected touch point pair exists or not may be checked. Modification 1-1 is described in detail below.

Figure 14:
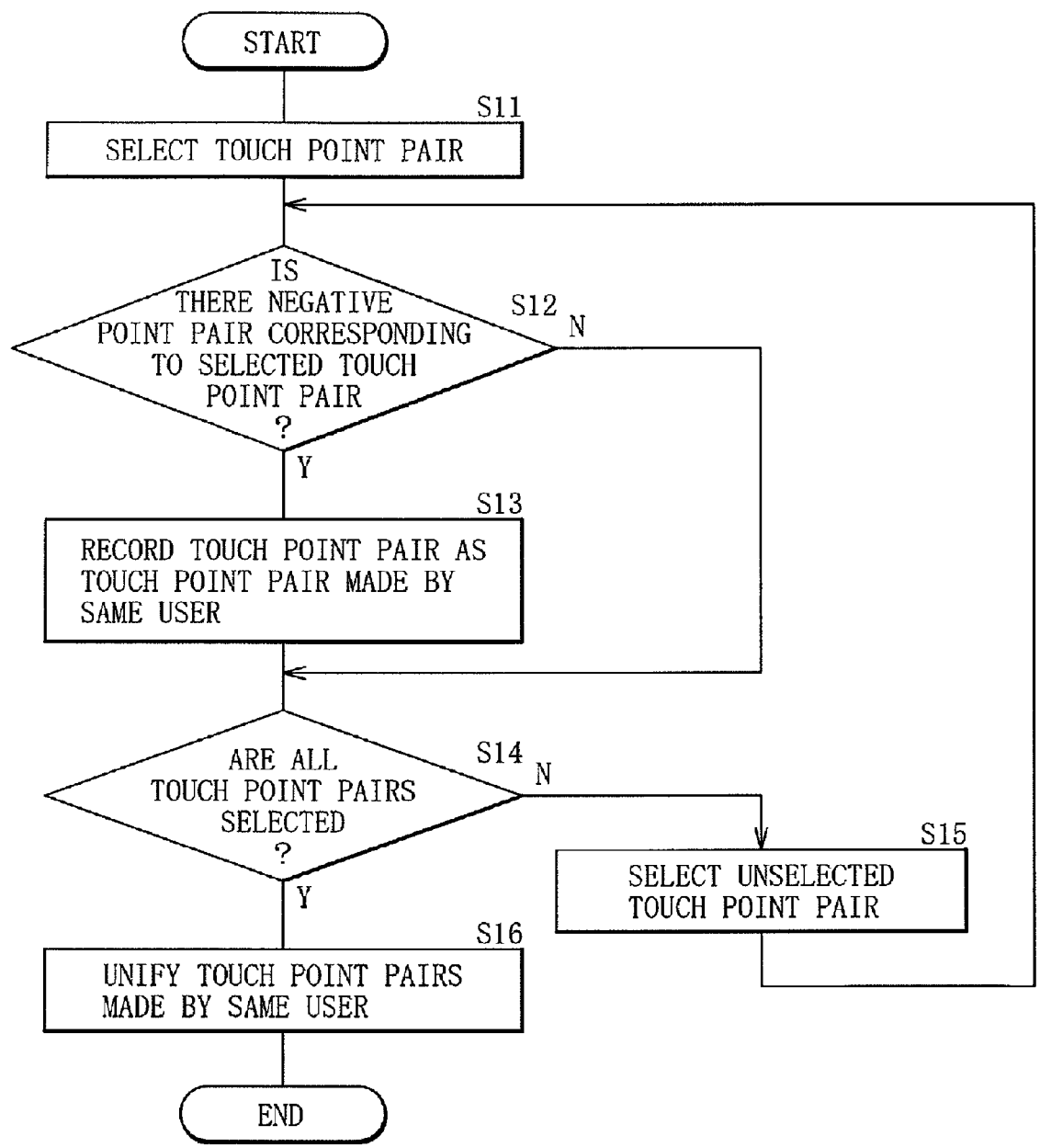
FIG. 14 is a flowchart illustrating an exemplary operation of an analysis section according to a modification of a first embodiment.

FIG. 14 illustrates a flowchart of operation of an analysis section 45B according to the Modification 1-1.

First, the analysis section 45B selects a pair of touch points TP (a touch point pair) among all touch points TP (step S11).

Subsequently, the analysis section 45B checks whether or not there is a pair of negative points NP (a negative point pair) corresponding to the touch point pair selected in the step S11 (step S12). Specifically, the analysis section 45B checks whether or not the negative point NP exists at each of a position specified by an x coordinate of a first touch point TP of the touch point pair and a y coordinate of a second touch point TP thereof, and a position specified by an x coordinate of the second touch point TP and a y coordinate of the first touch point TP thereof. If there is no negative point pair corresponding to the selected touch point pair, the flow is advanced to step S14.

If there is a negative point pair corresponding to the selected touch point pair in the step S12, the analysis section 45B records the touch point pair as a touch point pair made by the same user (step S13).

Subsequently, the analysis section 45B checks whether all touch point pairs have been selected or not (step S14). If not all the touch point pairs have been selected, the analysis section 45B selects an unselected touch point pair (step S15), and the flow is advanced to the step S12. The analysis section 45B repeats the steps S12 to S15 until all the touch point pairs are selected.

If all the touch point pairs have been selected in the step S14, the analysis section 45B unifies the touch point pairs made by the same user as with the analysis section 45 according to the first embodiment (step S16).

This is the end of the flow. In this case, effects similar to those in the first embodiment are also obtained.

[Modification 1-2]

In the first embodiment, the analysis section 45 determines whether or not a plurality of touch points TP are made by the same user, and the tracking process section 33 filters such determination results, thereby even if the plurality of touch points TP are located on the same drive electrode 11 or the same sensor electrode 12, a possibility of occurrence of erroneous detection is reduced. The method of reducing such a possibility of occurrence of erroneous detection is not limited thereto. For example, the touch position detection section 40 may monitor a peak value of the signal component SC of each touch region TR. Specifically, for example, when a pair of touch points TP made by the same user are located on the same drive electrode 11, positions, at which a pair of negative points NP corresponding to the pair of touch points are to be formed, may be substantially superposed on positions of such a pair of touch points. Hence, the signal component SC may be slightly reduced. Consequently, when a pair of touch points TP are located on the same drive electrode 11 or the same sensor electrode 12, and when a peak value of the signal component SC becomes smaller than a peak value in a prior scan, it is possible to determine that the pair of touch points TP are made by the same user even if a pair of negative points NP are not detected.

2. Second Embodiment

A touch panel 2 according to a second embodiment is now described. The second embodiment is different from the first embodiment in a method of analyzing which touches are made by the same user. It is to be noted that substantially the same components as those of the touch panel 1 according to the first embodiment are designated by the same numerals, and description of them is appropriately omitted.

As illustrated in FIG. 1, the touch panel 2 includes a digital signal processing section 50. The digital signal processing section 50 includes a touch position detection section 60. As illustrated in FIG. 6, the touch position detection section 60 includes an analysis section 65. As with the analysis section 45 according to the first embodiment, the analysis section 65 analyzes which touches are made by the same user based on coordinates of each touch point TP supplied from the coordinate calculation section 44A and coordinates of each negative point NP supplied from the coordinate calculation section 44B. At this time, the analysis section 65 performs this analysis through sequentially selecting the negative points NP. Specifically, although the analysis section 45 according to the first embodiment sequentially selects the negative point pairs, the analysis section 65 according to the second embodiment sequentially selects the negative points NP themselves.

Figure 15:
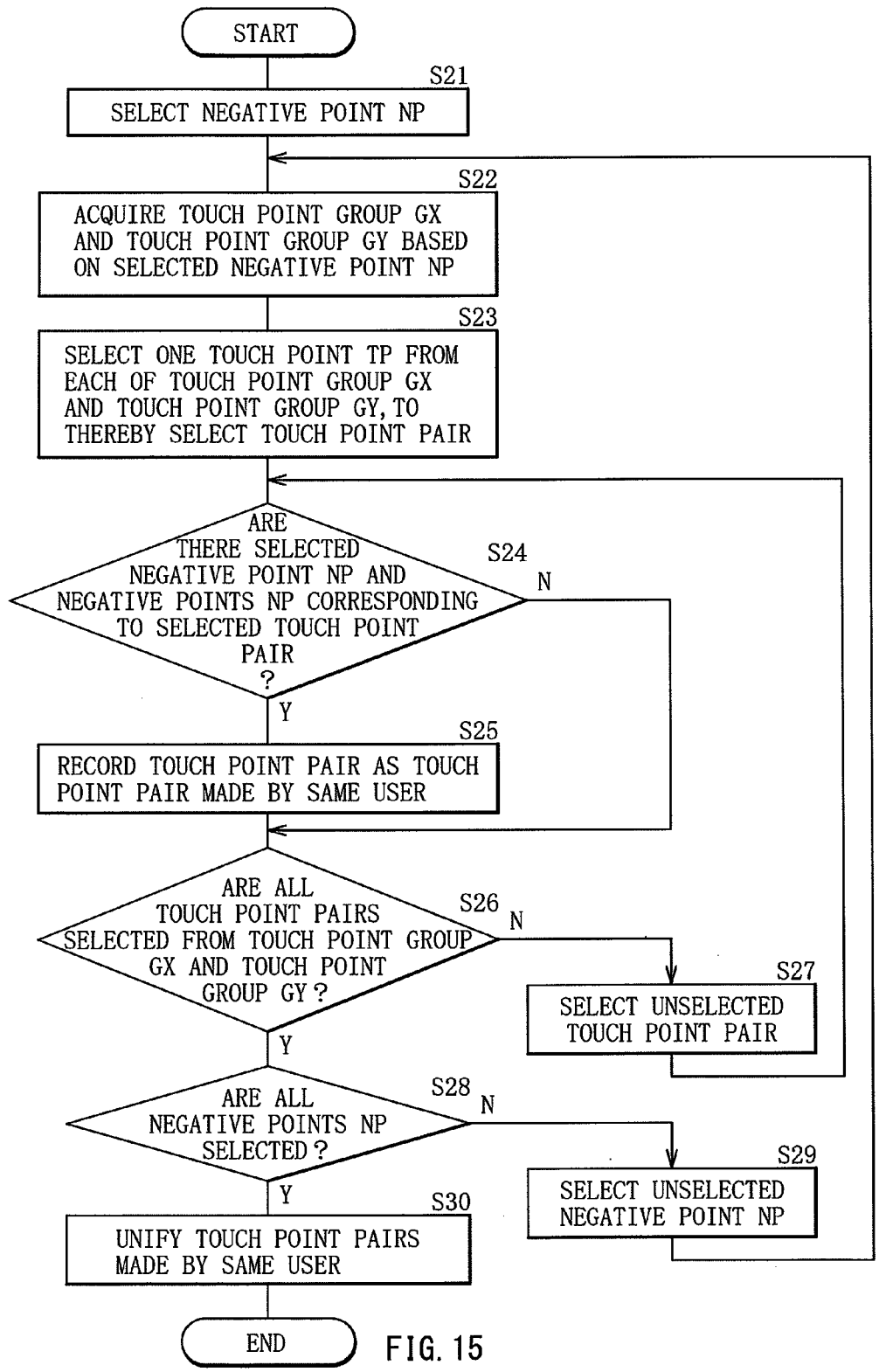
FIG. 15 is a flowchart illustrating an exemplary operation of an analysis section according to a second embodiment.

FIG. 15 illustrates a flowchart of operation of an analysis section 65.

First, the analysis section 65 selects one negative point NP among all negative points NP (step S21).

Subsequently, the analysis section 65 acquires a touch point group GX and a touch point group GY based on the negative point NP selected in the step S21 (step S22). The touch point group GX is a set of touch points TP having substantially the same x coordinate as that of the selected negative point NP among all the touch points TP. The touch point group GY is a set of touch points TP having substantially the same y coordinate as that of the selected negative point NP among all the touch points TP. Specifically, the x coordinate of each of the touch points TP belonging to the touch point group GX is within a predetermined amount Ax from the x coordinate of the selected negative point NP. The y coordinate of each of the touch points TP belonging to the touch point group GY is within a predetermined amount Ay from the y coordinate of the selected negative point NP. Such predetermined amounts Ax and Ay may be determined in consideration of a factor such as the barycentric processing performed by sections such as the coordinate calculation sections 44A and 44B.

Subsequently, the analysis section 65 selects one touch point TP from each of the touch point group GX and the touch point group GY, thereby selects a touch point pair (step S23).

Subsequently, the analysis section 65 checks whether or not there are the selected negative point NP, and negative points NP corresponding to the touch point pair selected in the step S23 (step S24). Specifically, the analysis section 65 checks whether or not a negative point NP exists at each of a position specified by an x coordinate of a first touch point TP of the touch point pair and a y coordinate of a second touch point TP thereof, and a position specified by an x coordinate of the second touch point TP and a y coordinate of the first touch point TP thereof. One of such negative points NP corresponds to the selected negative point NP, and the other corresponds to the negative point NP that is desirably checked to be present or not in the step S24. If such negative points NP do not exist, the flow is advanced to step S26.

If the selected negative point NP, and the negative points NP corresponding to the touch point pair selected in the step S23 are determined to exist in the step S24, the analysis section 65 records the touch point pair as a touch point pair made by the same user (step S25).

Subsequently, the analysis section 65 checks whether or not all touch point pairs have been selected from the touch point group GX and the touch point group GY (step S26). If not all the touch point pairs have been selected, the analysis section 65 selects one touch point TP from each of the touch point group GX and the touch point group GY, and thereby selects an unselected touch point pair (step S27), and the flow is advanced to the step S24. The analysis section 65 repeats the steps S24 to S27 until all the touch point pairs are selected.

If all the touch point pairs have been selected in the step S26, the analysis section 65 checks whether all the negative points NP are selected or not (step S28). If not all the negative points NP have been selected, the analysis section 65 selects an unselected negative point NP (step S29), and the flow is advanced to the step S22. The analysis section 65 repeats the steps S22 to S29 until all the negative points NP are selected.

If all the negative points NP have been selected in the step S28, the analysis section 65 unifies the touch point pairs made by the same user as with the analysis section 45 according to the first embodiment (step S30).

This is the end of the flow.

Operation of the analysis section 65 is now described with a specific example.

Figure 16:
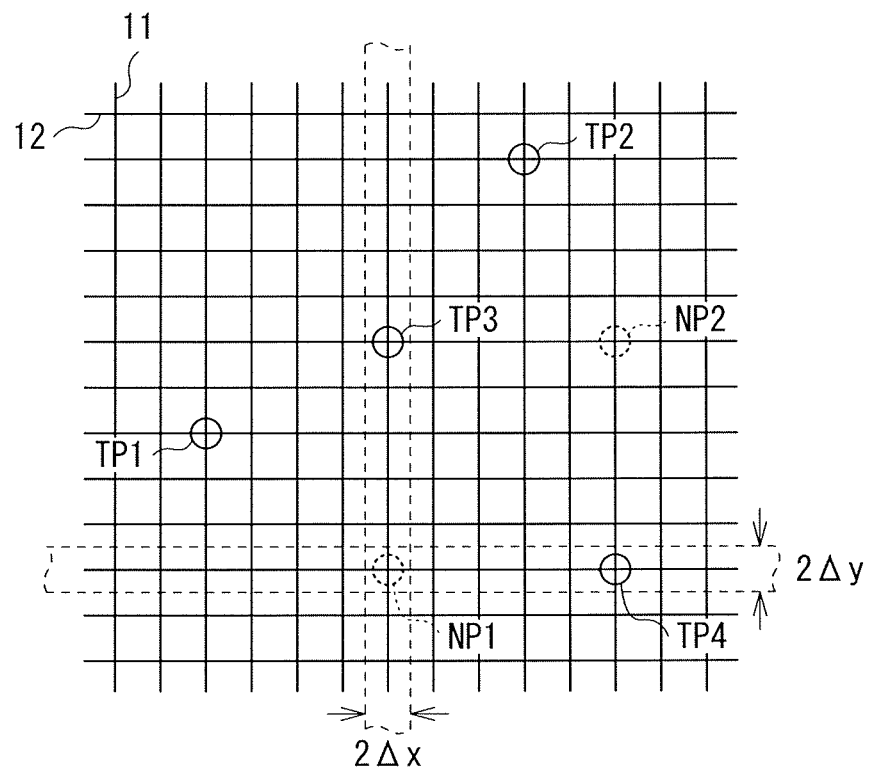
FIG. 16 is an explanatory diagram illustrating an exemplary operation of the analysis section according to the second embodiment.

FIG. 16 illustrates coordinates of each of the touch points TP and the negative points NP in specific example 3. The specific example 3 is the same as the specific example 1 according to the first embodiment. Specifically, a touch point TP1 indicates a touch made by a user U1, a touch point TP2 indicates a touch made by a user U2, and touch points TP3 and TP4 indicate touches made by a user U3. In addition, a pair of negative points NP1 and NP2 corresponding to a pair of touch points TP2 and TP3 are provided.

First, the analysis section 65 selects a negative point NP1 (step S21), and acquires a touch point group GX and a touch point group GY based on the negative point NP1 (step S22). In the specific example 3, only the touch point TP4 belongs to the touch point group GX, and only the touch point TP3 belongs to the touch point group GY. The analysis section 65 selects such touch points TP3 and TP4 as a touch point pair (step S23). In the specific example 3, since there are the negative point NP1 and the negative point NP2 corresponding to the touch point pair (the touch points TP3 and TP4) (step S24), the analysis section 65 records the touch point pair as a touch point pair made by the same user (step S25). In the specific example 3, since only one touch point TP exists in each of the touch point group GX and the touch point group GY, all touch point pairs are consequently selected (step S26).

Subsequently, the analysis section 65 selects a negative point NP2 (step S21), and acquires a touch point group GX and a touch point group GY based on the negative point NP2 (step S22). In the specific example 3, only the touch point TP3 belongs to the touch point group GX, and only the touch point TP4 belongs to the touch point group GY. The analysis section 65 then selects such touch points TP3 and TP4 as a touch point pair (step S23). In the specific example 3, since there are the negative point NP2 and the negative point NP1 corresponding to the touch point pair (the touch points TP3 and TP4) (step S24), the analysis section 65 records the touch point pair as a touch point pair made by the same user (step S25). The touch point pair (the touch points TP3 and TP4) is already recorded as a touch point pair made by the same user. In the specific example 3, since only one touch point TP exists in each of the touch point group GX and the touch point group GY, all touch point pairs are consequently selected (step S26).

Subsequently, since there are two negative points NP (the negative points NP1 and NP2) in the specific example 3, all the negative points NP are consequently selected (step S28). In addition, since there is only one touch point pair made by the same user, the analysis section 65 does not unify touch point pairs (step S30), and this flow is finished.

Through such steps, the analysis section 65 detects that the touch points TP3 and TP4 are made by the same user, and there are three users (a user for the touch point TP1, a user for the touch point TP2, and a user for the touch points TP3 and TP4).

As described above, the touch panel of the second embodiment analyzes which touches are made by the same user through sequentially selecting the negative points. In this case, effects similar to those in the first embodiment are also obtained.

[Modification 2-1]

The Modification 1-2 of the first embodiment may be applied to the touch panel 2 according to the second embodiment.

3. Application Examples

Application examples of any of the touch panels described in the above-described embodiments and the Modifications are now described.

Figure 17:
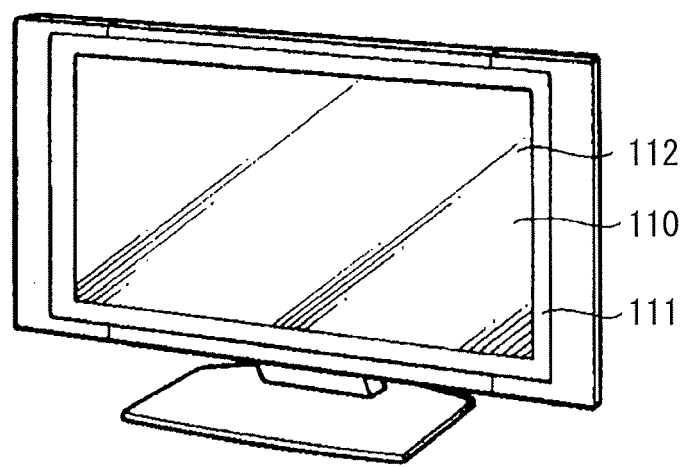
FIG. 17 is a perspective diagram illustrating an appearance configuration of a television unit to which one of embodiments is applied.

FIG. 17 illustrates appearance of a television unit to which any of the touch panels according to the above-described embodiments and the Modifications is applied. The television unit may have, for example, an image display screen section 110 including a front panel 111 and filter glass 112. The image display screen section 110 includes the touch panel according to any of the above-described embodiments and the Modifications.

Figure 18:
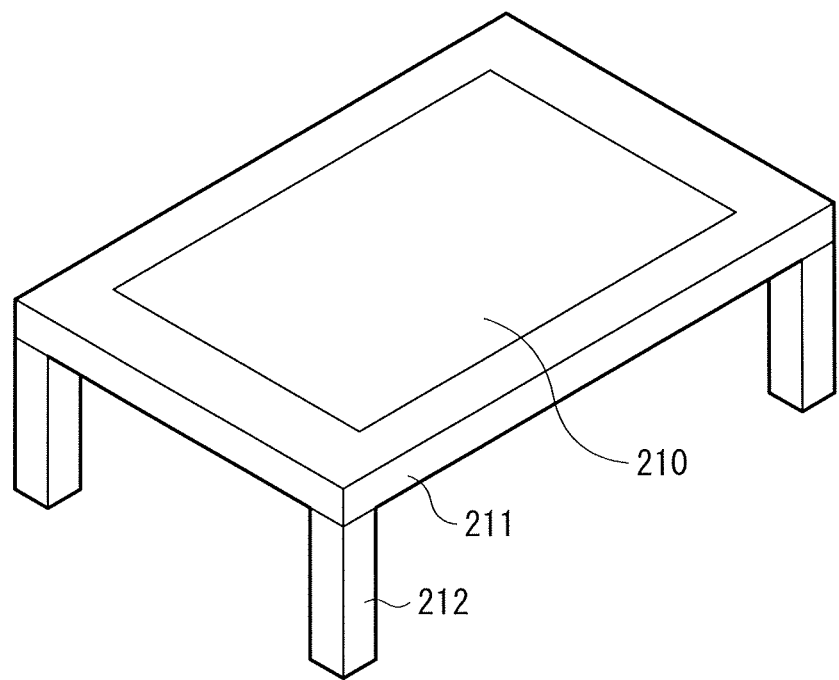
FIG. 18 is a perspective diagram illustrating an appearance configuration of a table to which one of embodiments is applied.

FIG. 18 illustrates appearance of a table to which any of the touch panels according to the above-described embodiments and the Modifications is applied. The table may have, for example, an image display screen section 210, a body section 211, and a leg section 212. The image display screen section 210 includes the touch panel according to any of the above-described embodiments and the Modifications.

The touch panel according to any of the above-described embodiments and the Modifications is applicable to an electronic apparatus in any field. In addition to the television unit and the table, examples of the electronic apparatus may include a monitor unit that displays images output from a personal computer or the like, and a tablet terminal. In other words, the touch panel according to any of the above-described embodiments and the Modifications is applicable to an electronic apparatus that displays images in any field. In particular, applying the touch panel according to any of the above-described embodiments and the Modifications to a unit having a large display screen allows a plurality of users to easily operate the touch panel.

Although the present technology has been described with reference to the example embodiments, the Modifications, and the application examples directed to an electronic apparatus hereinbefore, the technology is not limited thereto, and various modifications or alterations thereof may be made.

For example, although the touch panel has been singly configured in each of the above-described embodiments, this is not limitative. Alternatively, for example, a display panel and a touch panel may be integrally configured into a display panel having a touch detection function. Specifically, for example, a so-called on-cell type, in which a touch detection device is directly provided on a display surface of a display panel, or a so-called in-cell type, in which a touch detection device is provided in a display panel, may be configured.

Furthermore, the technology encompasses any possible combination of some or all of the various embodiments described herein and incorporated herein.

It is possible to achieve at least the following configurations from the above-described example embodiments of the disclosure.

(1) A touch detection circuit, including:
  a touch detection section configured to detect a plurality of touch points made by one or more users, based on positive data in a touch data map that includes the positive data and negative data; and
  a determination section configured to detect, based on the negative data in the touch data map, a plurality of negative points, and determine, based on the plurality of negative points, touch points made by same user in the plurality of touch points.
(2) The touch detection circuit according to (1), wherein the determination section sequentially selects a negative point pair from the plurality of negative points, and detects whether or not a touch point pair corresponding to the selected negative point pair exists in the plurality of touch points.
(3) The touch detection circuit according to (2),
wherein the touch data map is obtained from a touch detection device that includes a plurality of drive electrodes extending in a first direction and a plurality of sensor electrodes extending in a second direction, and
wherein, in the existence of the touch point pair, the touch point pair exists at positions of a first diagonal point pair of a rectangle, the rectangle being defined by the first diagonal point pair, by a second diagonal point pair corresponding to the selected negative point pair, and by four side directions corresponding to the first direction and the second direction.
(4) The touch detection circuit according to (2) or (3), wherein, in the existence of the touch point pair, the determination section determines that the touch points configuring the touch point pair are made by the same user.
(5) The touch detection circuit according to (1), wherein the determination section sequentially selects a touch point pair from the plurality of touch points, and detects whether or not a negative point pair corresponding to the selected touch point pair exists in the plurality of negative points.
(6) The touch detection circuit according to (5), wherein, in the existence of the negative point pair, the determination section determines that the touch points configuring the selected touch point pair are made by the same user.
(7) The touch detection circuit according to (1),
wherein the touch data map is obtained from a touch detection device that includes a plurality of drive electrodes extending in a first direction and a plurality of sensor electrodes extending in a second direction, and
wherein the determination section
focuses on one of the plurality of negative points, and obtains a first touch point group and a second touch point group, the first touch point group being configured of touch points that are located in the first direction with reference to the focused negative point out of the plurality of touch points, and the second touch point group being configured of touch points that are located in the second direction with reference to the focused negative point out of the plurality of touch points,
selects one touch point from each of the first touch point group and the second touch point group to sequentially select a touch point pair, and
detects whether or not a negative point pair containing the focused negative point exists at positions of a first diagonal point pair of a rectangle, the rectangle being defined by the first diagonal point pair, by a second diagonal point pair corresponding to the selected touch point pair, and by four side directions corresponding to the first direction and the second direction.
(8) The touch detection circuit according to (7), wherein, in the existence of the negative point pair, the determination section determines that the touch points configuring the selected touch point pair are made by the same user.

(9) The touch detection circuit according to (7) or (8), wherein the determination section sequentially focuses on one of the plurality of negative points.
(10) The touch detection circuit according to any one of (1) to (9), wherein
the touch detection section and the determination section perform processing on a series of the touch data maps, and
the determination section corrects a most-recent result of the determination, based on a result of the determination by the determination section on one or the plurality of touch data maps.
(11) A touch detection method, including:
detecting a plurality of touch points made by one or more users, based on positive data in a touch data map that includes the positive data and negative data;
detecting, based on the negative data in the touch data map, a plurality of negative points; and
determining, based on the plurality of negative points, touch points made by same user in the plurality of touch points.
(12) An electronic apparatus provided with a touch detection device and a touch detection circuit, the touch detection device being configured to detect an external proximity object, the touch detection circuit including:
a touch detection section configured to detect a plurality of touch points made by one or more users, based on positive data in a touch data map that includes the positive data and negative data; and
a determination section configured to detect, based on the negative data in the touch data map, a plurality of negative points, and determine, based on the plurality of negative points, touch points made by same user in the plurality of touch points.
(13) The electronic apparatus according to (12), wherein the touch detection device is a capacitance touch detection device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A touch detection circuit, comprising:
a touch detection section circuit configured to detect a plurality of touch points made by one or more users, based on positive data in a touch data map that includes the positive data and negative data; and
a determination section circuit configured to detect, based on the negative data in the touch data map, a plurality of negative points, and determine, based on the plurality of negative points, touch points made by same user in the plurality of touch points,
wherein the touch detection section circuit and the determination section circuit perform processing on a series of the touch data maps, and
wherein the determination section circuit corrects a most-recent result of the determination, based on a result of the determination by the determination section circuit on one or the plurality of touch data maps.
2. The touch detection circuit according to claim 1, wherein the determination section circuit sequentially selects a negative point pair from the plurality of negative points, and detects whether or not a touch point pair corresponding to the selected negative point pair exists in the plurality of touch points.

3. The touch detection circuit according to claim 2,
wherein the touch data map is obtained from a touch detection device that includes a plurality of drive electrodes extending in a first direction and a plurality of sensor electrodes extending in a second direction, and
wherein, in the existence of the touch point pair, the touch point pair exists at positions of a first diagonal point pair of a rectangle, the rectangle being defined by the first diagonal point pair, by a second diagonal point pair corresponding to the selected negative point pair, and by four side directions corresponding to the first direction and the second direction.

4. The touch detection circuit according to claim 2, wherein, in the existence of the touch point pair, the determination section circuit determines that the touch points configuring the touch point pair are made by the same user.

5. The touch detection circuit according to claim 1, wherein the determination section circuit sequentially selects a touch point pair from the plurality of touch points, and detects whether or not a negative point pair corresponding to the selected touch point pair exists in the plurality of negative points.

6. The touch detection circuit according to claim 5, wherein, in the existence of the negative point pair, the determination section circuit determines that the touch points configuring the selected touch point pair are made by the same user.

7. The touch detection circuit according to claim 1,
wherein the touch data map is obtained from a touch detection device that includes a plurality of drive electrodes extending in a first direction and a plurality of sensor electrodes extending in a second direction, and
wherein the determination section circuit,
focuses on one of the plurality of negative points, and obtains a first touch point group and a second touch point group, the first touch point group being configured of touch points that are located in the first direction with reference to the focused negative point out of the plurality of touch points, and the second touch point group being configured of touch points that are located in the second direction with reference to the focused negative point out of the plurality of touch points,
selects one touch point from each of the first touch point group and the second touch point group to sequentially select a touch point pair, and
detects whether or not a negative point pair containing the focused negative point exists at positions of a first diagonal point pair of a rectangle, the rectangle being defined by the first diagonal point pair, by a second diagonal point pair corresponding to the selected touch point pair, and by four side directions corresponding to the first direction and the second direction.

8. The touch detection circuit according to claim 7, wherein, in the existence of the negative point pair, the determination section circuit determines that the touch points configuring the selected touch point pair are made by the same user.

9. The touch detection circuit according to claim 7, wherein the determination section circuit sequentially focuses on one of the plurality of negative points.

10. A touch detection method performed by a touch detection circuit, the method comprising: detecting a plurality of touch points made by one or more users, based on positive data in a touch data map that includes the positive data and negative data; detecting, based on the negative data in the touch data map, a plurality of negative points; determining, based on the plurality of negative points, touch points made by same user in the plurality of touch points; performing processing on a series of the touch data maps; and correcting a most-recent result of the determination of touch points, based on a result of the determination on one or the plurality of touch data maps.

11. An electronic apparatus provided with a touch detection device and a touch detection circuit, the touch detection device being configured to detect an external proximity object, the touch detection circuit comprising:
a touch detection section circuit configured to detect a plurality of touch points made by one or more users, based on positive data in a touch data map that includes the positive data and negative data; and
a determination section circuit configured to detect, based on the negative data in the touch data map, a plurality of negative points, and determine, based on the plurality of negative points, touch points made by same user in the plurality of touch points,
wherein the touch detection section circuit and the determination section circuit perform processing on a series of the touch data maps, and
wherein the determination section circuit corrects a most-recent result of the determination, based on a result of the determination by the determination section circuit on one or the plurality of touch data maps.

12. The electronic apparatus according to claim 11, wherein the touch detection device is a capacitance touch detection device.

* * * * *